United States Patent [19]

Bach

[11] 3,733,968
[45] May 22, 1973

[54] BRAKE PEDAL TRAVEL LIMITER FOR HYDRAULIC BRAKE BOOSTER

[75] Inventor: Lloyd G. Bach, South Bend, Ind.

[73] Assignee: The Bendix Corporation, South Bend, Ind.

[22] Filed: Oct. 1, 1971

[21] Appl. No.: 185,612

[52] U.S. Cl. .................................. 91/391 R, 91/469
[51] Int. Cl. ................................................ F15b 13/10
[58] Field of Search ..................... 91/391 R, 391 A, 91/469

[56] References Cited

UNITED STATES PATENTS

| | | | |
|---|---|---|---|
| 3,093,120 | 6/1963 | Ayers, Jr. | 91/391 A |
| 3,143,930 | 8/1964 | Ayers, Jr. | 91/391 A |
| 3,610,102 | 10/1971 | Brown, Jr. | 91/391 R |
| 3,646,850 | 3/1972 | Boyer | 91/391 R |

Primary Examiner—Paul E. Maslousky
Attorney—Ken C. Decker et al.

[57] ABSTRACT

A hydraulic boost device for brakes having a housing with a bore therein in communication with an inlet and an outlet. A booster piston is slidably received in the housing so that one end of the piston communicates with a pressure chamber which is in fluid communication with the bore. Valve means is slidably located in the bore for controlling fluid communication between the inlet, outlet and pressure chamber. Brake pedal operated means including a push rod and ratio changer levers are interconnected with the booster piston and the valve means so that brake pedal and push rod travel during a normal braking operation with hydraulic power assist will always be at some predetermined ratio to piston travel. Should a hydraulic failure occur in the boost device during a brake application, means effectively restricts push rod movement with respect to the booster piston thereby minimizing pedal travel.

9 Claims, 2 Drawing Figures

PATENTED MAY 22 1973 3,733,968

INVENTOR.
LLOYD G. BACH
BY
*Ken C. Decker*
ATTORNEY

BRAKE PEDAL TRAVEL LIMITER FOR HYDRAULIC BRAKE BOOSTER

BACKGROUND OF THE INVENTION

The present invention relates to a hydraulic boost device for use in the brake system of an automotive vehicle.

The hydraulic boost device will unquestionably in time replace the vacuum booster because of its smaller size and less weight for a given power output. In hydraulic boost devices of the type herein shown, fluid pressure from the vehicle's power steering pump is utilized to assist the operator of the vehicle in applying the brakes. Where hydraulic power boost is employed to accomplish vehicle braking the brake pedal can be mounted much closer to the floor of the vehicle than for manual braking since total pedal travel required for power braking is less. For power operation of the brakes a valve spool is moved only a few thousandths of an inch at a time for each brake application until the vehicle is stopped. Also there is usually a ratio changer lever system connected to the pedal operated push rod, piston, and valve so that with hydraulic power the push rod will travel a distance somewhat less than the distance traveled by the booster piston. In case of failure in hydraulic power, the push rod and brake pedal will move forward as much as 1½ inches before the push rod abuts the piston in performing a manual braking application. This exaggerated pedal travel gives the operator the feeling that the brakes are leaking down and this is undesirable. Moreover, during this period of excessive push rod and pedal travel, vehicle braking is further delayed until the push rod is solidly connected to the booster piston.

With respect to the prior art, reference is made to U. S. Pat. No. 3,603,209 and to U. S. applications, Ser. No. 13,415, filed Feb. 24, 1970, now Pat. No. 3,633,462, and Ser. No. 73,933, filed Sept. 21, 1970, now Pat. No. 3,688,498 assigned to the common assignee of the present invention, as showing boosters of the type aforementioned. This invention is proposed as a solution to the problem of excessive push rod and pedal travel encountered in the prior art.

SUMMARY OF THE INVENTION

The principal object of the invention is to provide a fluid operated brake booster of the foregoing type having means effective upon booster malfunction for operatively connecting the push rod to the booster piston.

Another object of the invention is to provide a fluid operated brake booster having means effective in the event of inadequate fluid pressure for operatively locking the push rod to the booster piston.

A still further object of the invention is to provide means operative in case of inadequate fluid pressure in the brake booster for connecting the brake pedal to the booster piston with a minimum loss in pedal and push rod travel with respect to the piston.

An important object of the invention is to provide a valve mechanism in a hydraulic brake booster for minimizing brake pedal and push rod travel with respect to the piston in the transition from hydraulic power assist to manual braking.

The above and other important objects and features of the invention will be apparent from the following description of the device taken in connection with the accompanying drawing.

DETAILED DESCRIPTION

Figure 1:
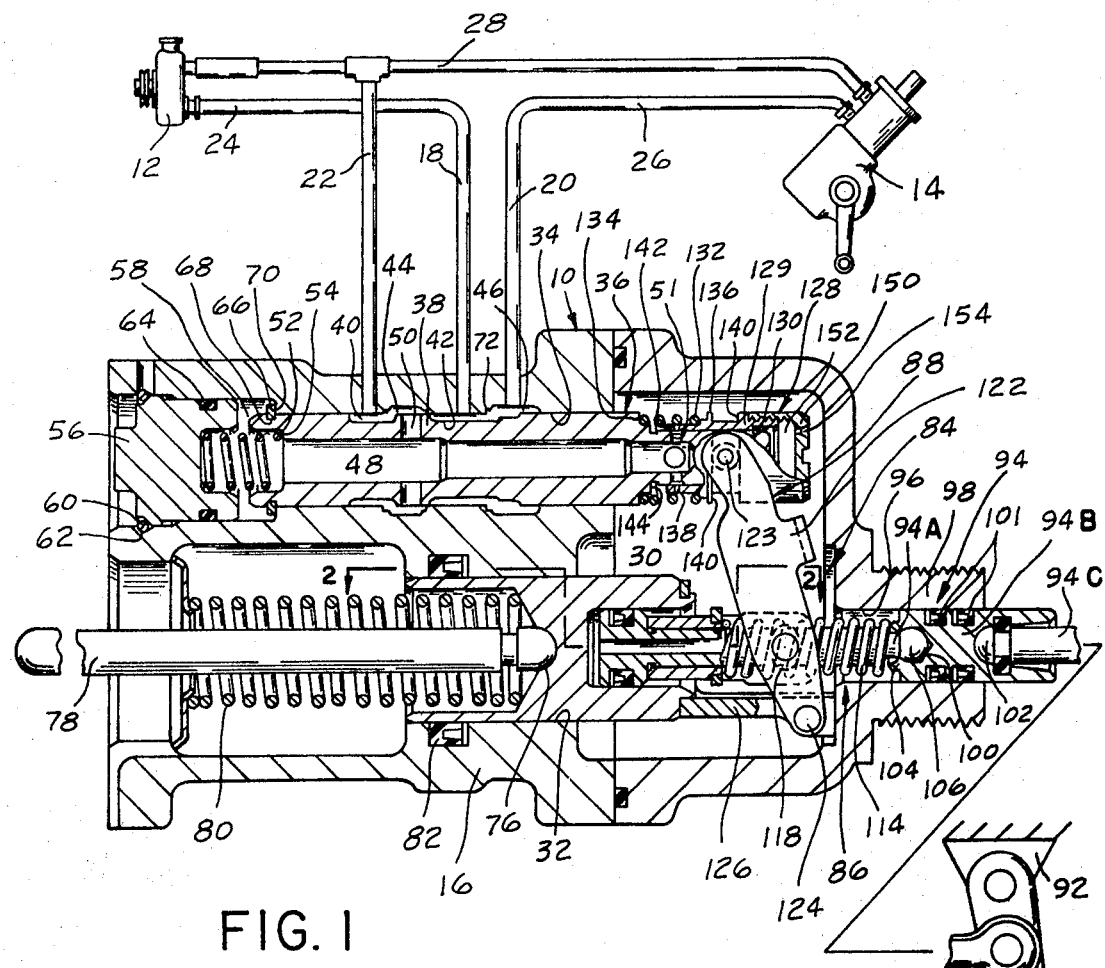
FIG. 1 is a schematic view of a vehicle hydraulic system incorporating a hydraulic brake boost device made pursuant to the teachings of my invention and illustrated in longitudinal cross-sectional view.
Figure 2:
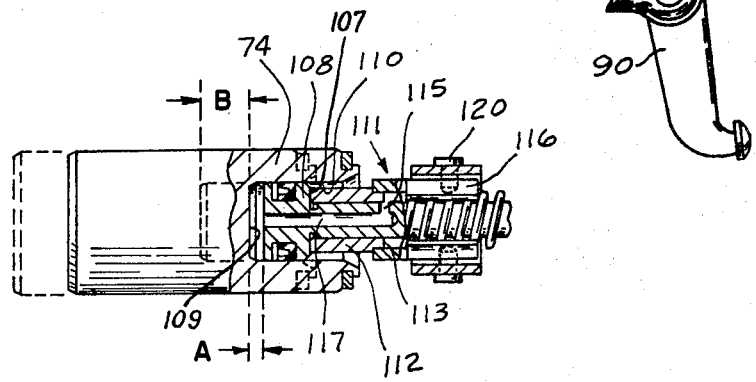
FIG. 2 is a fragmentary sectional view taken substantially along the line 2—2 of FIG. 1.

Referring now to FIG. 1 of the drawings, a brake boost device, designated by the reference numeral 10, is located in a vehicle hydraulic system comprising an engine driven power steering pump 12 and steering gear 14 operatively connected to its associated wheels, not shown, in a manner well known to those skilled in the art. The boost device 10 comprises a housing 16 provided with an inlet port 18, an outlet port 20 and an exhaust port 22. The inlet port 18 communicates with the outlet port of the pump 12 through a conduit 24. The outlet port 20 is in communication with the inlet of the steering gear 14 via pipe line 26. The exhaust port 22 is connected to conduit 28 which is the return line from the outlet of the steering gear to the inlet of the pump 12.

The housing 16 is divided into a pressure chamber 30 and two parallel bores 32 and 34. Valve means 36 for controlling the fluid pressure level in the chamber 30 is located in the bore 34 and includes a spool valve 38. The spool valve 38, which is slidably received within the bore 34, is formed with annular recesses 40 and 42 communicating respectively, with the exhaust port 22 and the inlet port 18. The bore 34 is further provided with annular grooves or recesses 44 and 46. Recess 46 is in communication with the outlet port 20. The recess 44 continuously communicates with central passage 48 of the spool valve via radial passages 50. Radial passages 51 connect the central passage 48 of the spool valve with the pressure chamber 30. The spool valve 38 is retained in its released position in the bore 34, as viewed in FIG. 1, by a spring 52 interposed between abutment 54 of the spool valve 38 and end closure member 56. The member 56 is securely retained in counterbore 58 of the bore 34 by an annular ring 60 mounted in groove 62 of the counterbore. A seal 64 prevents the escape of hydraulic fluid from between the member 56 and the counterbore 58. A stop washer 66 located in a groove 68 of the spool valve, engages a shoulder 70 of the counterbore 58 to restrain spool valve movement to the right and to appropriately locate the spool valve so that its fluid recesses 40 and 42 are in proper relationship with the grooves 44 and 46 of the bore 34. In its released position to the right as viewed in FIG. 1, the spool valve passes fluid from the inlet port 18 to the outlet port 20 via grooves 42 and 46. Also, in this same position, the spool valve connects the pressure chamber 30 to the exhaust port 22 through the radial passages 51, central passage 48, radial passages 50, and recesses 44 and 40. The recesses 40 and 44 overlap to permit the free flow of fluid therebetween in the released position of the valve means 36. It will be noted that the grooves 42 and 46 have an overlapping portion 72 which prevents completely cutting off hydraulic fluid to the outlet 20 and the steering gear 14 when the spool valve is in its full applied position, to the left as viewed in FIG. 1. However, slidably displacing the spool valve to the left, as viewed in FIG. 1, which as aforementioned is in the brake applying direction, closes the annular recesses 40 and 44 to intercommunication and opens the annular recesses 42 and 44 to communication, connecting the inlet port 18 to the pressure chamber 30. For a detail description of the construction and operation of the spool valve 38, reference is made to U. S. Pat. application Ser. No. 13,415, filed Feb. 24, 1970, assigned to the common assignee of the present invention.

A piston 74 is reciprocally positioned in the bore 32 with one end of the piston exposed to the pressure in the chamber 30. The other end of the piston 74 is formed with a socket 76 against which one end of a force transmitting pin 78 abuts for drivably connecting the piston 74 to a conventional automotive master cylinder, not shown, in a manner well known to those skilled in the art. A return spring 80 urges the piston 74 toward the brake release position as seen in FIG. 1. A seal 82 prevents leakage of hydraulic fluid from the chamber 30 between the bore 32 and piston 74.

Control of the valve means 36 and piston 74 is under the influence of operator-operated means 84 which comprises a force transmitting assembly 86 and ratio changer lever means 88. The force transmitting assembly 86 is operatively connected between the piston 74 and a brake pedal 90. The brake pedal is suspended from a bracket 92 mounted in the driver's compartment of the vehicle. The force transmitting assembly 86 includes a thrust member or push rod 94 divided into three articulated sections 94A, 94B and 94C to facilitate manufacture, construction and assembly. Section 94B slides in an axial opening 96 of boss 98, the latter of which is integral with the housing 16. Section 94B is in the form of a plunger having opposed end sockets 100 and 102 for receiving the thrust of sections 94A and 94C. Grease seals 101 on the plunger 94B prevent the escape of fluid from the chamber 30. To prevent withdrawal of the section 94A from the socket 100, a flange 104 of the plunger 94B is rolled over on the spherical end 106 of the rod 94A. The end of the rod section 94A opposite from the spherical end 106, is equipped with a head member 108 having sliding movement in an axial cavity 110 of the piston 74. Before the flange 104 is rolled over on the spherical end 106 as aforementioned, a sleeve 112 and coil spring 114 are assembled to the rod section 94A. One end of the sleeve 112 is provided with a U-shaped portion having two laterally disposed axially extending arms 116, with the other end 107 of the sleeve abutting the head 108. The coil spring 114 is preloaded to a predetermined value between the U-shaped portion of the sleeve 112 and the flange 104 on section 94B. Each of the arms 116 is provided with a slot 118 for receiving pivot pins 120 which are drivably connected to lever 122 of the lever means 88. At its lower end, the lever 122 is rotated about pin 124 secured to a bracket 126 which is fixed to the piston 74 to move therewith. The upper end of the lever 122 is operatively connected by pivot 123 to the spool valve 38 through a shut-off valve 128 which includes a cylindrical valve member 129 slidably carried on the spool valve 38 for closing communication between the central bore 48 and the chamber 30. The details of the construction and operation of the lever means 88 are more fully described in U. S. application Ser. No. 35,800, filed May 8, 1970, assigned to the common assignee of the present invention.

To permit axial displacement or travel of the push rod 94, to the left in the drawings, during a normal brake application, at which time the spool valve 38 is actuated via pedal 90 and lever 122 to admit fluid under pressure to the chamber 30, a space A is provided between the head 108 and closed end 109 of the cavity 110. This spacing A must be dimensioned so as to allow adequate pedal travel and rod movement for completely opening the valve means 36 before collapsing the preloaded spring 114. From an inspection of the lever arrangement 88, it is apparent that during normal braking with power assist this gap A will increase to perhaps B after a brake application, particularly a severe one, since the piston 74 travels a greater distance than the rod 94A which travels the same distance as the pins 120 carried on the lever 122. If there should be a malfunction of the valve means 36 at this time, due to inadequate fluid pressure, for example, when the gap between the head 108 and closed end 109 of the cavity is B, the vehicle operator would have to push the pedal 90 through the distance B before manual assist would become effective. This "loss of pedal" feeling is disturbing to the operator and can cause the operator to panic. The prior art brake boosters all have this problem of excessive pedal travel in closing the gap between the piston and push rod upon failure of or inadequate hydraulic pressure due to collapse of spring 114. I overcome this with a mechanism 111 which controls brake pedal travel and push rod movement with respect to the piston 74 in the event of inadequate power assist necessitating additional pedal force which exceeds the preload of the spring 114. This control valve mechanism 111 actually limits or restricts push rod and pedal travel with respect to the piston 74 when the brake pedal force exceeds the spring preload by causing end 113 of the sleeve 112 to obstruct radial passage 115 in fluid communication with axial passage 117 of the rod 94A. This relative sliding movement between the sleeve 112 and the rod 94A, closing the passage 115, seals the cavity 110 from communication with the chamber 30 with which it communicates during normal power assist braking applications. With the cavity 110 sealed off, any further movement of the head 108 into the cavity must compress the hydraulic fluid which has very little elasticity. The additional pedal force is now applied to the piston 74 through the push rod 94 and column of hydraulic fluid in the cavity 110. It will be noted that push rod travel is substantially that necessary to cover the passage 115 which is only a fraction of an inch. Therefore, the push rod travel is something less than gap A and never approaches gap B, thus maintaining pedal and push rod travel with respect to the piston to a minimum when the brake pedal force exceeds the preload of spring 114. During normal power assist braking, communication is maintained between the cavity 110 and the chamber 30 through passages 117 and 115, since the spring preload is such as to hold the sleeve 112 against the head 108 thus uncovering radial passage 115. This open communication between the cavity 110 and the chamber 30 permits the free flow of hydraulic fluid into and out of the cavity during a normal braking cycle as the head 108 causes the volume of the cavity 110 to vary.

The cylindrical valve member 129 is urged against stop ring 130 on the spool valve 38 by a spring 132, interposed between abutment 134 of the spool valve 38 and annular flange 136 on the valve member 129. In this position of the valve member 129 against the stop ring 130, the chamber 30 communicates with the central passage 48 of the spool valve through the radial passages 51 of the spool valve and radial passages 138 of the valve member 129. The cylindrical valve member 129 is moved to closed position where communication is cut off between the central passage 48 and the pressure chamber 30 by the lever 122, the upper end of which lever engages an annular slot 140 of the cylindrical valve member 129. In the closed position of the shut-off valve, the radial passages 51 of the spool valve are out of registry with the radial passages 138 of the cylindrical valve member 129 and end 142 of the member 129 abuts a reduced diameter portion 144 of the valve spool. The cylindrical valve member 129 is closed by an end wall 150 to form a variable volume chamber 152. An orifice 154 communicates the chamber 152 with the chamber 30. The orifice 154 is sized to control the initial relative movement between the spool valve 38 and the cylindrical valve member 129, thus precluding the closing of radial passages 51 and 138 due to the inertia of spool valve 38 during a panic stop. For a detailed description of the construction and operation of the shut-off valve reference is made to U. S. Pat. application, Ser. No. 38,807, filed May 18, 1970, assigned to the common assignee of this invention.

MODE OF OPERATION

With the brake pedal 90 in released position, as shown in FIG. 1, the valve means 36, connects the inlet 18 to the outlet 20 through the annular recesses 42 and 46, permitting the fluid discharged from the pump 12 to pass uninterruptedly through the hydraulic boost device 10. Also in the released position aforementioned, the valve means 36 communicates the exhaust port 22 with the pressure chamber 30 via the annular recesses 40 and 44, radial passages 50, central passage 48, and radial passages 51. At this time the pressure in the chamber 30 is exhaust pressure. To make a brake application, i.e., to operate the hydraulic boost device 10, the vehicle operator depresses the pedal 90, causing it to swing about pivot 92, which drives the force transmitting rod 94 to the left, as viewed in FIG. 1. If we assume this to be a normal brake application, i.e., adequate fluid pressure and no valve malfunction, the preload on the spring 114 of the push rod assembly 86 is such as to hold the sleeve 112 in abutment with the head 108 so that displacement of the rod 94 rotates the lever 122 counterclockwise about the pivot 124. This rotation of the lever 122 acts on the spool valve 38 through the shut-off valve 128. However, the spring 132 of the shut-off valve is strong enough to prevent relative movement between the valve spool and valve member 129 so that the spool valve 38 is shifted to the left against the spool valve return spring 52. This shifting of the spool valve cuts off communication between the chamber 30 and the exhaust port 22 and establishes communication between the inlet port 18 and the pressure chamber 30. In this position of the spool valve annular recess 42 overlaps annular recess 44 to establish fluid communication with the chamber 30. At this time annular recess 42 also maintains fluid communication with annular recess 46 so as to not completely starve the outlet port 20 which is connected to the steering gear 14. The increase in pressure in the chamber 30 acts on the end of piston 74 urging the piston to the left, thus actuating the master cylinder, not shown, to which the pin 78 is drivably connected. Upon release of the vehicle brake pedal 90, the piston 74 and spool valve 38 are returned to their released positions by springs 80 and 52 respectively.

In the event of a malfunction of the boost device, whether due to a complete failure of hydraulic fluid pressure or to inadequate pressure to achieve the desired vehicle deceleration, or to a sticky valve, the vehicle brakes may be applied through manual assist. During such a malfunction, the operator has applied sufficient force to the pedal 90 to collapse the spring 114 and to force the head 108 away from engagement with the sleeve 112. This relative movement between the rod 94A and the sleeve 112 causes the end 113 of the sleeve to close the radial passage 115 in the rod so that the hydraulic fluid in the cavity 110 is captured. Confining the fluid in this manner limits any further travel of the head 108 within the cavity 110. The head 108 is now acting on the captured fluid tending to compress it to the extent possible but at the same time driving the piston. This eliminates the excessive push rod and pedal travel otherwise required in moving the rod end 108 into engagement with the bottom 109 of the cavity 110 to close the gap.

I claim:

1. In a hydraulic boost device including a housing having a pressure chamber and valve means for controlling the pressure in said chamber and a piston having one end exposed to the chamber pressure and operator-operated means comprising a force transmitting assembly including a push rod and a ratio changer lever means connecting respectively said piston and said valve means, the improvement which comprises:
   mechanism effective upon malfunction of the device for controlling the travel of the push rod with respect to the piston;
   said mechanism including a hydraulic fluid cavity in the piston into which the push rod projects, and means for capturing the fluid in said cavity to form a hydraulic connection between the rod and piston.

2. The improvement in claim 1 wherein said means for capturing the fluid in the cavity includes a passage in the push rod communicating the cavity with the pressure chamber, and a sleeve slidably carried by the push rod to be moved into closing relationship to the passage.

3. The improvement in claim 2 wherein said sleeve is spring preloaded to uncover the passage during normal actuation so that the push rod can move freely in the cavity.

4. The improvement in claim 3 wherein said sleeve is provided with laterally disposed axially extending arms having slots therein for engagement with said lever means.

5. A hydraulic boost device, which comprises:
   a housing having a bore therein with inlet and outlet ports opening thereinto;
   a chamber in the housing in fluid communication with said bore;
   a piston slidably positioned in the housing and having an end extending into the chamber;
   valve means in the bore for controlling communication between the inlet and outlet ports and the chamber; and
   operator-operated means including a force transmitting assembly having a push rod drivably connected to the piston and ratio changer lever means operatively connecting said force transmitting assembly to said valve means;

said operator-operated means further comprising a fluid cavity in that end of the piston which extends into the chamber for slidably receiving the push rod, and mechanism effective during an actuation if the chamber pressure is inadequate to move the piston for limiting the sliding movement of said push rod with respect to the piston so that manual assist is more quickly effected.

6. A hydraulic boost device, as recited in claim 5, wherein said push rod is provided with a passage communicating the cavity with said chamber, and a sleeve is slidably mounted on the push rod for controlling the flow of hydraulic fluid between the cavity and the chamber.

7. A hydraulic boost device, as recited in claim 6, wherein said sleeve is spring preloaded to uncover the passage during normal actuation and slidable against said preloaded spring in the event of a malfunction in the device to cause the sleeve to cover the passage.

8. A hydraulic boost device, as recited in claim 7, wherein said sleeve is operatively connected to said lever means at a point between the ends of said lever means.

9. A hydraulic boost device, as recited in claim 5, wherein said mechanism comprises a control valve.

* * * * *